(12) United States Patent
Bhogal et al.

(10) Patent No.: US 8,146,013 B2
(45) Date of Patent: Mar. 27, 2012

(54) ALLOWING AUTHORIZED POP-UPS ON A WEBSITE

(75) Inventors: Kulvir S. Bhogal, Fort Worth, TX (US);
Keys D. Botzum, Columbia, MD (US);
Kwang S. Kang, Austin, TX (US);
Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 1723 days.

(21) Appl. No.: 11/189,889

(22) Filed: Jul. 26, 2005

(65) Prior Publication Data

US 2007/0028185 A1 Feb. 1, 2007

(51) Int. Cl.
*G06F 3/048* (2006.01)
(52) U.S. Cl. ......... 715/808; 715/234; 715/708; 715/741
(58) Field of Classification Search .................. 715/808, 715/204–206, 234, 240, 273, 276, 705, 708, 715/714, 741–743, 760, 790, 794, 802
See application file for complete search history.

(56) References Cited

U.S. PATENT DOCUMENTS

| | | | | |
|---|---|---|---|---|
| 6,324,553 | B1 * | 11/2001 | Cragun et al. ................ | 715/513 |
| 7,111,246 | B2 * | 9/2006 | Sauve et al. .................. | 715/809 |
| 2003/0098883 | A1 * | 5/2003 | Pennell et al. ................ | 345/781 |
| 2004/0073634 | A1 | 4/2004 | Haghpassand | |
| 2004/0125149 | A1 | 7/2004 | Lapidous | |
| 2004/0181581 | A1 | 9/2004 | Kosco | |
| 2005/0066290 | A1 * | 3/2005 | Chebolu et al. .............. | 715/808 |
| 2005/0076084 | A1 * | 4/2005 | Loughmiller et al. ........ | 709/206 |
| 2006/0005148 | A1 * | 1/2006 | Cheng et al. .................. | 715/808 |
| 2006/0015722 | A1 * | 1/2006 | Rowan et al. ................. | 713/166 |
| 2006/0235960 | A1 * | 10/2006 | Lai et al. ....................... | 709/224 |

OTHER PUBLICATIONS

Moscola et al., "Implementation of a Content-Sharing Module for an Internet Firewall", Proceedings of the 11th Annual IEEE Symposium on Field-Programmable Custom Computing Machines (FCCM'03), copyright 2003 IEEE, p. 1.*
"Block Pop-up Windows with Internet Explorer", Microsoft Corporation, Aug. 4, 2004, http://www.microsoft.com/windowsxp/using/web/sp2_popupblocker.mspx, pp. 1-4.
"Popups", accessed May 26, 2005, http://www.spyware-removal-info.com/popups.html, 1 page.

* cited by examiner

*Primary Examiner* — William Bashore
*Assistant Examiner* — Andrew Tank
(74) *Attorney, Agent, or Firm* — Stephen J. Walder, Jr.; David A. Mims, Jr.

(57) ABSTRACT

Mechanisms to allow authorized popup windows on a website are provided. With the mechanisms, one or more identifiers of authorized popup window sources are associated with website content. When the website content is downloaded to a client device in response to a request, the one or more identifiers are also provided to the client device. A popup blocker application resident on the client device uses the one or more identifiers to generate a filter list of authorized popup window sources against which the source of popup windows may be compared when the popup window attempts to be loaded into the browser. If the source of the popup window that is attempting to be loaded is not present in the list of authorized sources of popup windows, then the loading and output of the popup window content is blocked.

20 Claims, 5 Drawing Sheets

ALLOWING AUTHORIZED POP-UPS ON A WEBSITE

BACKGROUND OF THE INVENTION
1. Technical Field

The present invention relates generally to an improved data processing system. More specifically, the present invention is directed to a system and method to allow authorized pop-ups on a website.
2. Description of Related Art Content retrieved over the Internet in response to a user request is usually presented in a primary window of a web browser, such as Internet Explorer™ developed by Microsoft Corporation of Redmond, Wash. Some Internet content contains embedded instructions written in a script language, which cause opening of a new browser window without an additional user request.

Such a new browser window usually "pops up" in front of the primary window with the requested content, and is often referred to as a "popup" window. Usually, the size of a popup window is smaller than the size of a primary window, although this is not required, and the number of interface elements displayed in a popup window is smaller than in a primary window to increase space available for content. For instance, some popup windows display only a window title, and not a menu bar, a toolbar and an address bar. Content displayed in a popup window is often optimized for a fixed size and is presented in a window having non-resizable borders.

A popup window may also be opened in response to a direct user input, such as a click on a link. In this case, the user input does not specify that a new window has to appear. Rather, a content provider causes a new window to open by embedding special instructions associated with a standard user action. A significant number of Web sites prefer to display new content in an additional window without an address bar, instead of replacing content in a primary window.

Popup files may also be loaded into a user's system when a user downloads a file or program from the Internet. When downloading a file or program, additional undesirable files may be downloaded and installed on the user's system that cause popups to be presented when the user performs some action.

Popup windows may play a useful role, providing an additional means of delivering content outside of a primary window. Web sites may use popup windows to display advertisements or supplemental content such as navigation hints, subscription offers, input feedback, etc. However, many Internet users consider popup windows to be annoying distractions that decrease quality of their browsing experience. One of the main reasons for this is that popup windows make navigation more difficult: a user must manually close each popup window to avoid the accumulation of irrelevant windows on a desktop. As a result, a user has to spend at least twice as much effort to leave a site with a popup window than a site with no popup windows.

Content providers on the Internet also view this difficulty of navigation as a negative affect. That is, popup windows may often cause the user's attention to be distracted from the content of the web page provided by the content provider and cause the user to go through extra unnecessary steps to reach the requested content. In worst case scenarios, the frustration experienced by the user at navigating past the popup windows to reach the requested content may reach a level where the user chooses not to bother with viewing the requested content at all. Thus, popup windows, while capable of providing valuable added functionality and information, may also provide a source of such frustration and inconvenience to the user that both the end users and content providers would like to block the use of unauthorized popup windows in conjunction with a content provider's web page.

To prevent unsolicited popup windows from appearing, users may install special applications known as popup blockers. For instance, a Pop-Up Stopper™ Pro application, developed by Panicware Inc. of Seattle, Wash., enables a user to prevent all popup windows from opening. However, blocking all popup windows may significantly degrade the user experience on the sites that use popup windows to provide relevant content, references or input feedback. To mitigate this problem, Pop-Up Stopper™ Pro and other similar applications allow users to specify a list of sites allowed to open popup windows, and reject popup windows initiated by a site that is not included in the list. A problem with such a "white list" implementation is that, unless a popup window is displayed, a user may not know whether it is useful enough to request its display in the future.

Furthermore, such a "white list" provides a potential hole through which sources may insert their popup windows. In other words, if a source knows that a particular website uses popups to provide useful content, the source may exploit this to its own advantage by keying their own popup windows to be displayed when accessing that particular website. As a result, both wanted and unwanted popups will appear on the user's browser.

To give a user an option to see relevant popup windows, an alternative approach has been provided, in which a user is presented with all popup windows except those that are contained in a "black list" or contain proscribed words in their content or title. In this case, the user is constantly required to teach an application which popup windows must be rejected. Stored black lists rapidly become obsolete with changes of domains and headers used by advertisers. In addition, rejecting a popup window based on its title or content may not provide a workable solution because a popup window has to be loaded on the user computer before its title or content becomes known. As a result, this approach decreases a useful bandwidth and may also present a security risk if popup content was retrieved as a result of redirection to an unknown server.

Thus, the traditional solutions to curtailing the nuisance of popup windows tend to be over inclusive by blocking all popup windows, provide some hole through which unwanted popup windows may still be presented to the user, or simply are not workable due to the rapid changes of the Internet and the manner by which popup windows are loaded by web browsers.

SUMMARY OF THE INVENTION

In view of the above, it would be beneficial to have a system and method for filtering and/or blocking popup window content on an individual basis such that only popup window content expressly authorized by a owner/developer of the requested website content are permitted to be presented in association with the requested website content. The present invention provides a system and method for performing such filtering and/or blocking of popup window content.

With the system and method of the present invention, one or more identifiers of authorized popup window sources are associated with website content. When the website content is downloaded to a client device in response to a request, the one or more identifiers are also provided to the client device. A popup blocker application resident on the client device uses the one or more identifiers to generate a filter list of authorized popup window sources against which the source of popup windows may be compared when the popup window attempts to be loaded into the browser. If the source of the popup window that is attempting to be loaded is not present in the list of authorized sources of popup windows, then the loading and output of the popup window content is blocked.

The mechanisms of the present invention may be used alone or in combination with other traditional popup blocker applications. Thus, both the user of the client device and the owner/developer of the requested website content may designate which popup windows are allowed to be presented via the client device's browser application.

In one exemplary embodiment of the present invention, a method is provided for presenting popup window content. The method comprises receiving requested website content from a source of the requested website content and receiving, from the source of the requested website content, one or more identifiers of authorized sources of popup window content, wherein the one or more identifiers are associated with the requested website content. The requested website content is output via an output device coupled to the data processing system and output of popup window content of popup windows whose source does not match an authorized source of popup window content in the one or more identifiers of authorized sources of popup window content is blocked while the requested website content is being output by the output device coupled to the data processing system.

The method may further comprise generating a filter list based on the one or more identifiers of authorized sources of popup window content. The blocking of the output of popup window content may be performed by comparing a source of popup window content to the filter list and blocking output of the popup window content if a matching entry in the filter list is not identified by the comparison.

In addition, the method may further comprise detecting a transition from requested website content to other website content in a browser of a data processing system and clearing the filter list in response to detecting the transition. Furthermore, the filter list may be associated with requested website content and a plurality of filter lists may be stored for use in determining whether to block popup windows. In such an embodiment, the method may further comprise identifying a filter list corresponding to current website content being output by the output device.

In one exemplary embodiment of the present invention, the one or more identifiers of authorized sources of popup window content may be provided in code of the requested website content. For example, the one or more identifiers of authorized sources of popup window content may be provided as part of a meta tag in code of the requested website content. In such an exemplary embodiment, the method may output the requested website content via an output device coupled to a data processing system by parsing the code of the requested website content to render the code via a browser application on the data processing system. While parsing the code of the requested website content, the meta tag in the code of the requested website content corresponding to the one or more identifiers of authorized sources of popup window content may be identified and a filter list may be generated based on the identified meta tag in the code of the requested website content.

The method may be implemented by a plugin module to a browser application, an application running on the data processing system, an applet loaded by a browser application, or the like. Moreover, the method may be hard coded in a hardware device associated with a data processing system.

In addition to the method set forth above, the exemplary embodiments of the present invention also provide a computer program product for implementing the above described method, and an apparatus having a processor, a network interface coupled to the processor, and an output device coupled to the processor, where the processor executes instructions for implementing the method described above.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
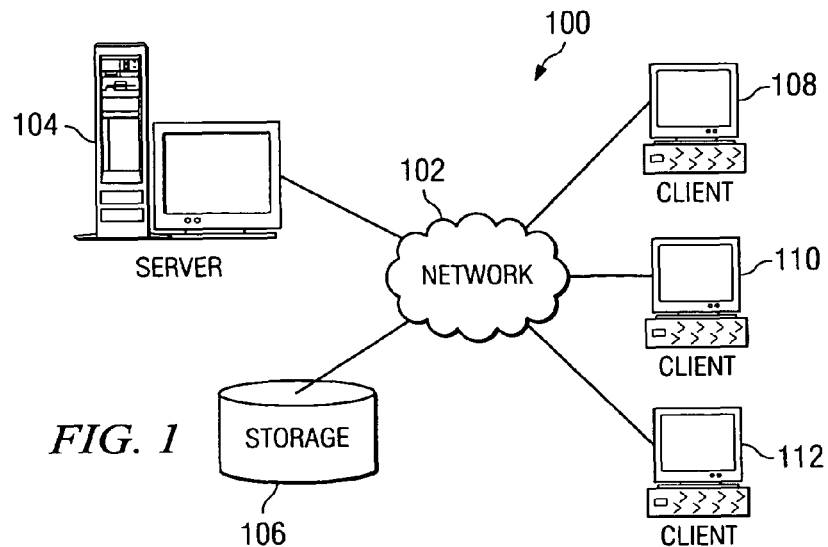
FIG. 1 is an exemplary diagram of a network data processing system in which aspects of the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
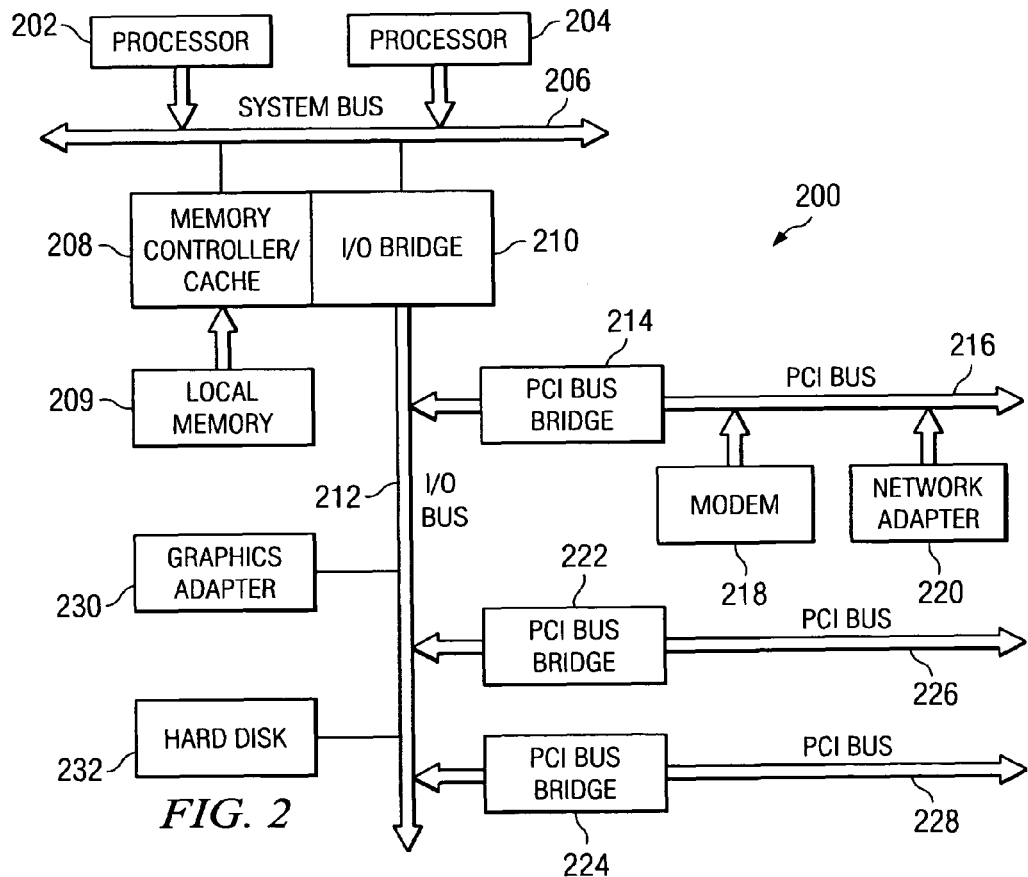
FIG. 2 is an exemplary block diagram of a server data processing system in which aspects of the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, New York, running the Advanced Interactive Executive (AIX) operating system or LINUX operating system.

Figure 3:
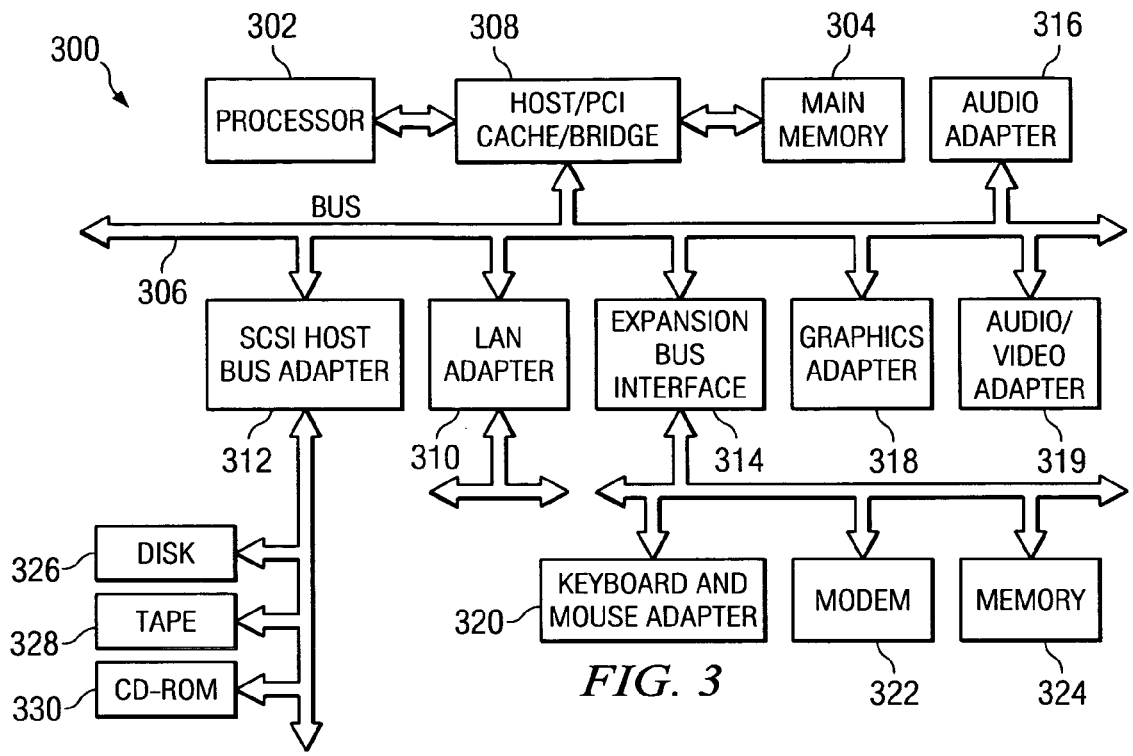
FIG. 3 is an exemplary block diagram of client data processing system in which aspects of the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer, hand held computer, portable communication device, such as a mobile telephone or the like, in addition to taking the form of a PDA. Data processing system 300 also may be a kiosk or a Web appliance.

As is generally known in the art, server data processing systems, such as server 104, provide content to client devices, such as client device 108, via the one or more networks 102. For example, the client device 108 may run a browser application through which the user of the client device 108 may enter requests for content and which communicates with the server 104 to retrieve the requested content. As is generally known, a user may enter a Uniform Resource Locator (URL) or domain name, which is used with a domain name server (DNS) to identify a network address, e.g., an Internet Protocol (IP) address, from which to retrieve the requested content. The entry of such a URL or domain name may be direct manual entry by the user, or may be indirect through operations performed by the user in a graphical user interface (GUI) of the browser application, e.g., selecting a hyperlink in the GUI or the like. The requested content is retrieved by the browser application and rendered in the GUI of the browser application.

As mentioned above, while requesting content from servers over the network, popup windows may be generated by scripts or other executable programs embedded in or otherwise associated with the requested content. Some of these popup windows may be popup windows that are wanted by the user of the client device and others may be unwanted popup windows, such as advertisements and the like.

In some instances, these popup windows are not authorized by the website owner who supplied the requested content. That is, through other browsing by the user of the client device, the user may have unknowingly retrieved a program, file or script that causes popup windows to be displayed by the browser when the user is browsing other requested content. In such a situation, the popup windows may not be affiliated with the subsequently requested content. For example, a vendor may generate a popup window program, file or script that causes a popup window advertisement to be displayed when the user of the client device requests content from a competitor's website.

In general, the blocking of popup windows has been left to the client devices. That is, the user of the client device must install a popup blocker application which is used to block popup windows. Some of these popup blocker applications permit the user of the client device to designate "black lists" and/or "white lists" for identifying those websites where popup windows should be allowed and websites where popup windows should be blocked. Such mechanisms tend to be over inclusive and block popup windows indiscriminately or provide a security hole through which unwanted popup windows may still be generated, as discussed previously above. What is needed is a mechanism for filtering popup windows on a website such that only those authorized by the website owner and not blocked by the user of the client device are permitted to be generated in a client device's browser application. The present invention provides such a mechanism, as described in greater detail hereafter.

Figure 4:
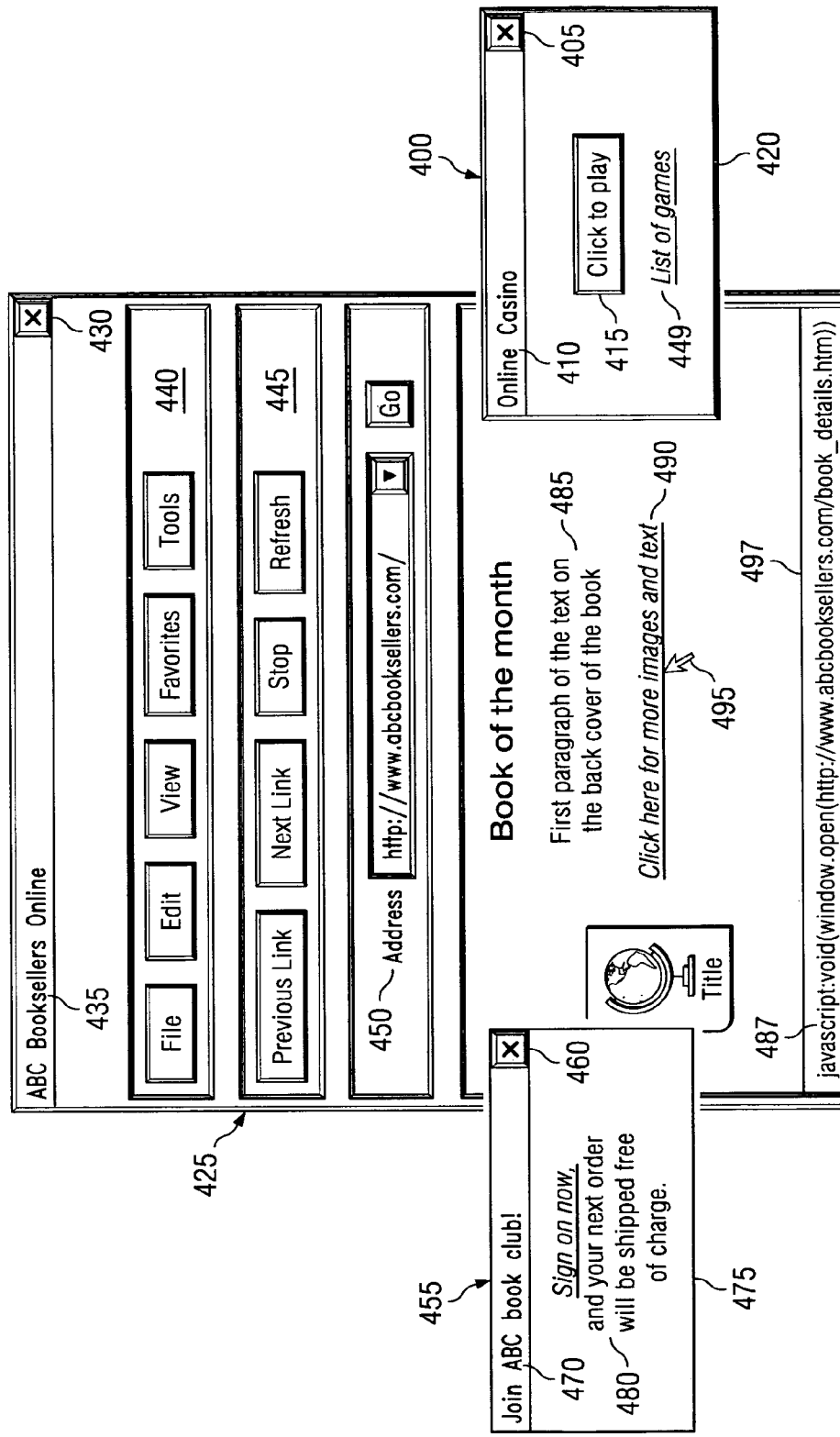
FIG. 4 is a diagram illustrating the display of multiple windows on a display of a data processing system in accordance with the prior art.

FIG. 4 is a diagram illustrating the display of multiple windows on a display of a data processing system in accordance with the prior art. As shown in FIG. 4, content 485 retrieved over a computer network in response to a user request is displayed in a primary browser window 425 that contains multiple interface elements outside of a document display area. These interface elements include a title bar 435 containing a "Close" button 430, a menu bar 440, a tool bar 445, an address bar 450, and a status bar 497. Names of exemplary interface elements follow naming conventions used in the Internet Explorer application. Primary window 425 has resizable borders 465, indicated by double borderlines.

Primary window 425 is overlapped by a secondary window 455, automatically opened after the retrieval of content 485. Secondary window 455 partially obscures the main content 485. To restore its visibility, a user must perform an additional action (e.g., to click inside primary window 425 to move it on top or to click on a button 460 to close secondary window 455).

The user recognizes secondary window 485 as a popup window based on a set of clues associated with the appearance and history of popup windows.

A popup window usually contains a smaller number of interface elements than a main window, allowing a more effective use of the small window area for content display. Loss of functionality (for instance, due to omission of the address bar) is tolerated because an expected way to navigate from a popup window is to click on the link provided inside the content. In the presented example, popup 455 contains title bar 470, but no menu bar, tool bar, address bar or status bar.

Content presented in a popup window is often optimized for a fixed-size window, i.e., non-resizable window borders are used to prevent users from changing the size of the popup window. In the presented example, non-resizable border 475 is indicated by its narrow width (a single borderline instead of a double borderline).

Different popup windows may have different combinations of user interface elements, placement and size. For example, a popup window 400 presenting content 415 inside resizable borders 420 is located in the background and does not obscure primary window 425. Some web sites deliberately place their popup windows in the background, so that they become visible only after the primary window is closed.

The popup windows may be generated in response to a user request, i.e. a user action in the GUI of the browser, or automatically without a user request. A popup window appearing without a user request can be opened, for example, by a function embedded in the main content, such as a handler of an "onload" event written in the JavaScript language. Alternatively, a popup window can be opened without a user request by a third-party application.

In the example shown on FIG. 4, cursor 495 is positioned over a link 490, while a status bar 497 displays a content retrieval instruction 487 associated with that link. In this example, content retrieval instruction 487 is a JavaScript function embedded in the content 485, containing a call to open a new window and retrieve new content. If a user clicks on link 490, the call to open a new window is executed and a new window is opened without a further user action. In this way, a decision to open a new window is made not by the user, but by a content provider who embedded an instruction to open a new window into the main document.

Figure 5:
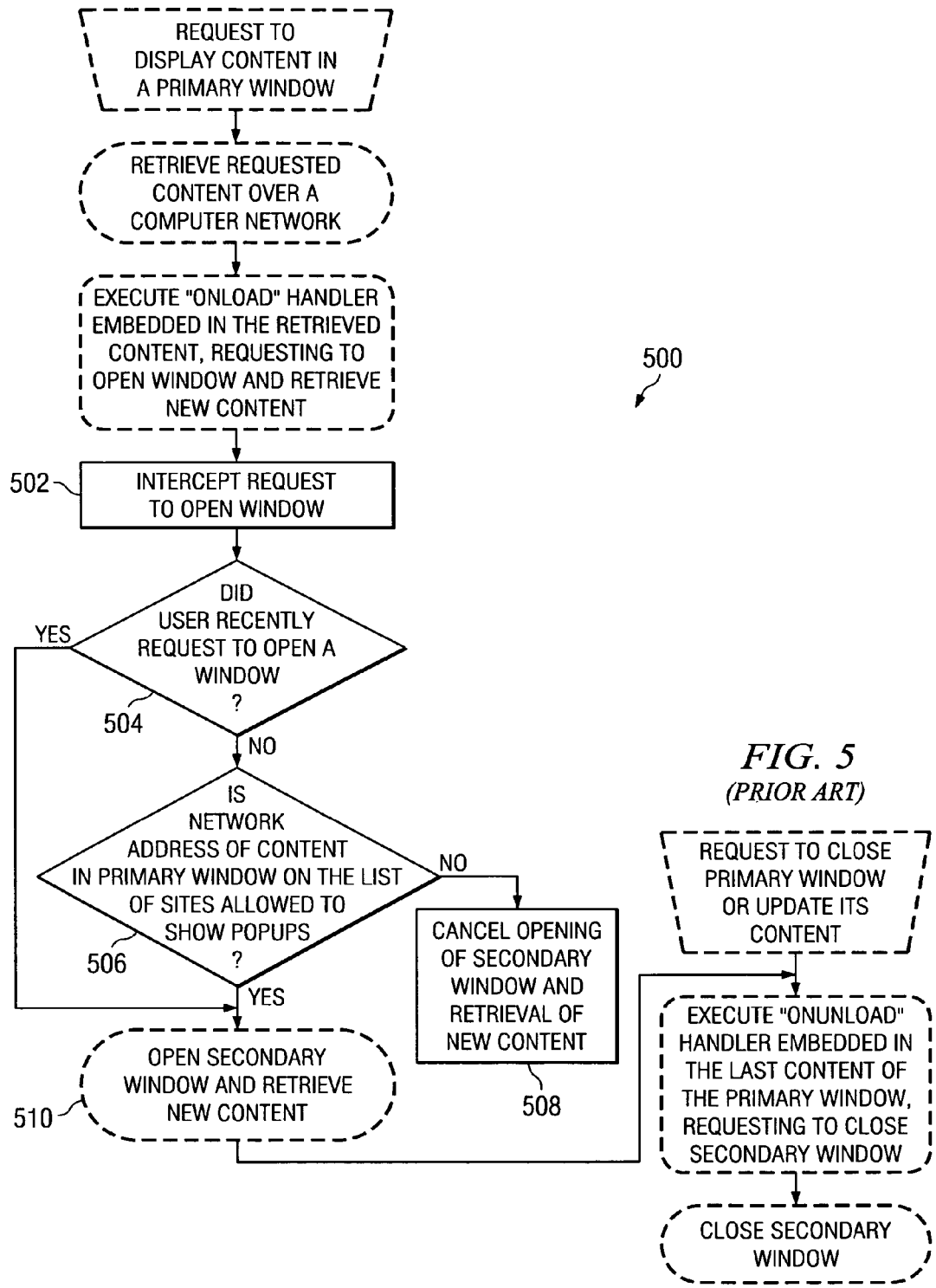
FIG. 5 is a flowchart outlining a prior art methodology for controlling the display of popup windows.

FIG. 5 is a flowchart outlining a prior art methodology for controlling the display of popup windows. In this embodiment, operations controlling popup behavior are performed by a specially developed module such as a designated application, a Browser Helper Object or a plug-in.

Once a user requests to display content in a primary browser window, the browser retrieves the requested content from a computer network and loads it into a browser window. The retrieved content may include an embedded function (e.g., a function written in a JavaScript language) that contains an "onload" event handler consisting of a set of instructions that the browser will execute when an "onload" event is detected. An "onload" event handler may contain an instruction to open a secondary window and retrieve new content.

Blocks 502 through 508 illustrate a prior-art solution that limits an unauthorized display of popup windows. According to this solution, a special module (e.g., a Browser Helper Object supporting an interface with Internet Explorer), intercepts a request to open a new window (block 502) and determines whether a user has recently requested to open a secondary window (block 504). If this determination is negative, the module compares the network address of the content in the primary window with a pre-defined "white list" of sites that are allowed to open popups (block 506). If the network address is not on the "white list," the secondary window is closed or prevented from opening, and the retrieval of the new content is canceled (block 508). Otherwise, if the user has recently requested to open a secondary window, or if the network address is on the "white list," the browser opens the secondary window and retrieves the new content.

A secondary window opened at block 510 may be subsequently closed without an additional user request using an "onunload" event handler. That is, a content provider embeds an "onunload" event handler that will close a previously opened popup window after the user requests to change content in the primary window (e.g., by entering a new network address in the address bar and pressing "Go"). That is, once the browser issues an "onunload" event indicating that the last content in the primary window is unloaded, the "onunload" event handler executes a set of instructions requesting to close the secondary window.

As discussed above, this prior art solution requires the user of the client device to manage pre-defined lists of allowed or restricted sites and depends on content providers to close popup windows without user requests. However, such an approach tends to block popup windows indiscriminately and does not consider the particular popup windows that are generated on each website. That is, the prior art approaches key the allowance or denial of popup windows to which requested websites are permitted to generate popup windows on the client device, and do not consider the actual source of the popup window content.

In other words, the popup window content may be generated by a third party with the website owner of the requested web page either permitting the third party's popup window to be displayed in association with the requested website content, or not being aware of the third party's popup window being displayed in association with the requested website content. This is often the case with advertisers who enter into agreements with website owners to allow their popup advertisement windows to be displayed in association with the website owner's website. Alternatively, as touched upon above, malicious or otherwise unauthorized third party popup window programs, files or scripts may be unknowingly installed on a client device and displayed in association with a website owner's website without the express permission of the website owner.

The prior art approach shown in FIG. 5 does not address such a situation. With the prior art approach in FIG. 5, such third party popup windows are either blocked because all popup windows, even those authorized popup windows that provide additional functionality or information, are blocked, or permits such third party popup windows to be generated in a client device's browser because no popup windows are blocked. Moreover, even if a "white list" system, in which keywords or terms are used to identify popup windows that are permitted to be generated in the client device's browser, is used, third party popup windows may still be permitted to be generated if they contain the identified keywords or terms. Thus, all prior art approaches to handling popup windows fall either into an over inclusive solution or under inclusive solution. There is no ability in the known systems to allow a website owner/developer to designate which popup windows should be permitted to be generated on a client device's browser.

Moreover, there is no ability for the client device's browser to determine, on an individual basis, whether a particular popup window should be allowed to be generated or not based on whether popup windows are permitted for the particular website and whether the particular popup window is an authorized popup window as identified by the website owner/developer. The present invention provides such ability.

With the present invention, when a content request is received by a server hosting a website whose content is being requested, the server transmits the requested content and one or more identifiers of authorized popup window sources to the requesting client device. The requested content and one or more identifiers are received by the requesting client device which includes a mechanism for controlling the presentation of popup windows on the client device based on the one or more identifiers. The requested content is rendered on the client device, such as by a browser application or the like, and the one or more identifiers are stored for later processing of popup windows.

When a popup window attempts to be presented on the client device, the source of the popup window is compared against those sources identified by the one or more identifiers received with the requested content. If the source of the popup window matches a source identified by the one or more identifiers, and the user of the client device has not blocked popup windows with the particular website, the popup window is allowed to be presented via the browser application on the client device. If the source of the popup window does not match a source identified by the one or more identifiers, or if the user has blocked popup windows with the present website, the presentation of the popup window is blocked.

The particular identifiers to which the popup window sources are compared is keyed to the current website content being presented by the browser application. Thus, when the user of the client device transitions to another website via the browser application, the identifiers of a previous website are no longer utilized. This may involve, for example, detecting the transition from one website's content to another website's content in the browser, i.e. detecting a change in the content being rendered by the browser. Upon detecting such a transition, filter list generated based on the received identifiers may be cleared and repopulated with identifiers associated with a current website's content, if any.

Of course, the particular sets of identifiers of authorized sources of popup windows may be cached or otherwise stored in memory for repetitive use, such as when the user returns to a previously presented website. In such a case, a determination is made as to what is the current website content being presented by the browser application, e.g., the URL or other address of the source of the current website content may be identified. In addition, a correlation of this website with a set of one or more identifiers of authorized sources of popup windows is made, e.g., which entries in the cache or memory match the source address or URL, to identify which set of identifiers to use when determining whether to allow a particular popup window to be presented via the browser application.

In one exemplary embodiment, the one or more identifiers of authorized sources of popup windows may be provided in the code of the requested website content. For example, the one or more identifiers may be provided as metadata in meta tags of the HyperText Markup Language (HTML) code defining the content of a website. In one exemplary embodiment, this meta tag may be an element called "allowPopups" with which the website owner/developer may declare a list of authorized popup origination locations. As one example, the "allowpopups" meta tag may take the form: <metatag allowPopups hosts="www.ibm.com; www.tivoli.com; www.lotus.com">

When the website content is loaded by the browser application of a client device, as part of the processing of the HTML code, a plugin module, application, applet, or other functional software element may process the meta tag having the one or more identifiers to thereby set up popup blocking based on the one or more identifiers. That is, popup windows that do not originate from one of the identified authorized sources will not be permitted to be presented in the browser application of the client device even if the user of the client device has expressly allowed popups with the currently presented website. In the example above, if a popup window is attempting to be presented in the browser and its source is www.hotbuys.com, the popup window will not be allowed to be presented since its source does not match any one of www.ibm.com, www.tivoli.com or www.lotus.com.

If there are no identifiers of authorized sources of popup windows associated with requested content from a website server, then the popup blocking mechanisms of the present invention do not operate. Rather, traditional popup blocking may be utilized in which black lists, white lists, or the like, are used to perform such popup blocking. Of course, the present invention may be used in conjunction with traditional popup blocking as an additional layer of security such that popup windows must pass the filtering performed by both the traditional popup blocking mechanism and the mechanisms of the present invention before being permitted to be presented in a client device's browser.

Figure 6:
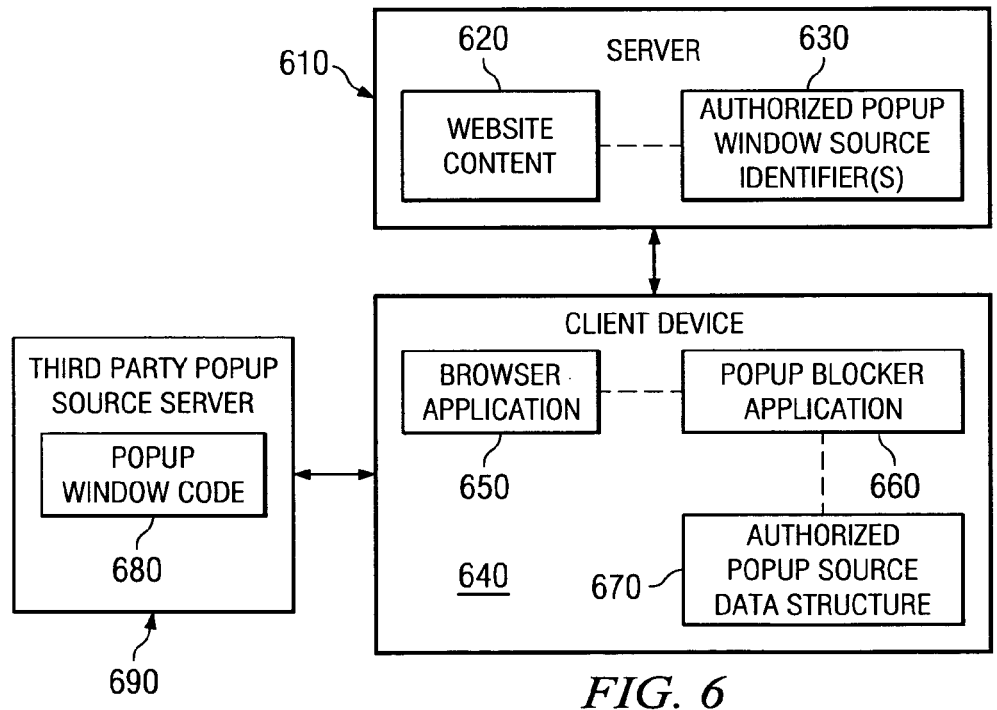
FIG. 6 is an exemplary block diagram illustrating the primary operational components of a system according to one exemplary embodiment of the present invention.

FIG. 6 is an exemplary block diagram illustrating the primary operational components of a system according to one exemplary embodiment of the present invention. As shown in FIG. 6, the server 610 includes website content 620 having identifiers 630 that identify the authorized sources of popup windows that may be presented on a client device 640 when the website content 620 is being presented on the client device 640.

The client device 640 includes a browser application 650 and an associated popup blocker application 660. The popup blocker application 660 may take many forms including a plugin module to the browser application 650, a separate application, an applet, or other software component running in the client device 640. Of course, while a software implementation of the popup blocker is envisioned as the preferred embodiment of the present invention, it should be appreciated that the popup blocker could also be implemented in hardware without departing from the spirit and scope of the present invention.

For example, in one exemplary embodiment, the mechanisms of the present invention may be implemented in hardware of a proxy server or firewall device. As such, the proxy server or firewall device may enforce the rules and requirements of the popup blocker application of the present invention for each client within an organization without needing to deploy the code on each client device's browser software. In other words, without modifying existing browsers an organization can implement the mechanisms of the present invention by providing hardware and/or software implementations of the present invention at the proxy server or firewall which would automatically implement the present invention for all the associated client devices.

Associated with the popup blocker application 660 is an authorized popup source data structure 670 which stores a correspondence between requested websites and the authorized popup window sources identified by the identifiers associated with the requested website content. This data structure 670 may be populated as website content is retrieved and processed by the browser application 650 and the popup blocker application 660. Entries in this data structure 670 may have associated lifetimes or may be cleared when the browser application 650 is closed or no longer running on the client device 640, for example. Alternatively, the data structure 670 may be made more permanent with entries being checked for updated information each time a website's content is downloaded.

When the website content 620 is downloaded to the client device 640, such as in response to the entry of a URL, IP address, or other type of network address via the browser application 650, the identifiers 630 are also downloaded to the client device 640. The website content 620 is processed by the browser application 650 and rendered on the client device 640, such as via a display device associated with the client device 640. In addition, the identifiers 630 are processed by the popup blocker application 660 which uses the identifiers 630 and the identification of the website content 620 to populate an entry in the authorized popup source data structure 670.

Thereafter, if a popup window is attempting to be presented via the browser application 650, such as popup window 680 from third party source server 690, the popup blocker application 660 uses the entry in the authorized popup source data structure 670 to determine whether the popup window should be allowed to be presented via the browser application 650.

For example, if during a browser session, the user of the client device 640 visits a number of websites, including a website hosted by the third party source server 690, a popup window script, file, or application, may unknowingly be retrieved and loaded into the client device 640. While viewing other website content, such as the website content 620, this popup window 680 may attempt to be displayed via the browser application 650. The popup blocker application 660 of the present invention will determine whether this popup window is permitted to be displayed via the browser application 650 based on the identifiers 630 of authorized sources of popup windows downloaded with the website content 620. The source of the popup window 680 is compared against the list of authorized sources of popup windows identified by the identifiers 630, as stored in the authorized popup source data structure 670. If the source 690 of the popup window 680 is not present in this list stored in the authorized popup source data structure 670, it is not permitted to be presented via the browser application 650. If the source 690 is present in the list, then the popup window will be permitted to be presented assuming that other traditional popup blocker applications do not block it from being presented, i.e. the user has not indicated that no popups are permitted with the currently displayed website via a traditional popup blocker application.

The determinations outlined above are performed on an individual basis as each popup window attempts to be presented via the browser application 650. Therefore, some popup windows may be permitted while others are not even though the same requested website content 620 remains being displayed by the browser application 650. Thus, the present invention provides a much finer filter of popup windows than was previously known in the art. The present invention does not tend to be over inclusive in its blocking of popup windows since only those popup windows that are not from authorized sources are blocked. Moreover, the present invention does not tend to be under inclusive in that all popup windows that are not from authorized sources are blocked. In addition, the present invention may operate in conjunction with more traditional popup blocker approaches so that the user of the client device may provide additional popup blocking preferences and thus, additional filtering of popup windows.

Figure 7:
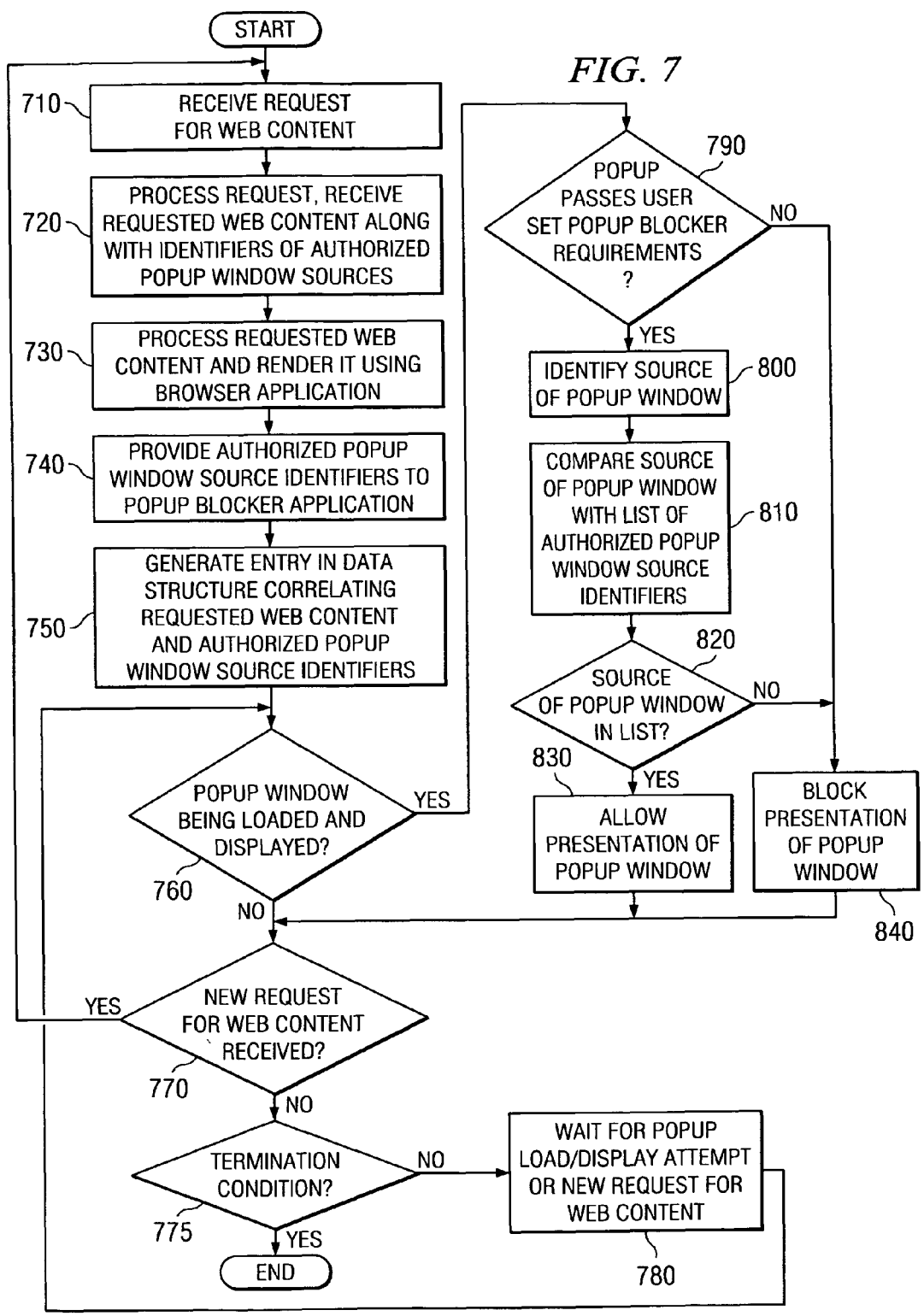
FIG. 7 is a flowchart outlining an exemplary operation of the present invention when processing requested website content having one or more associated authorized popup window source identifiers.

FIG. 7 is a flowchart outlining an exemplary operation of the present invention when processing requested website content having authorized popup window source identifiers provided with the requested website content. It will be understood that each block, and combination of blocks, of the flowchart illustration in FIG. 7, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks.

These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

As shown in FIG. 7, the operation starts with receiving a request for web content via a browser application (step 710). The request is processed and the web content is retrieved from its source along with one or more identifiers of authorized popup window sources (step 720). The requested web content is processed and rendered by the browser application (step 730). The one or more authorized popup window source identifiers are provided to a popup blocker application (step 740). The popup blocker application generates an entry in a data structure identifying the requested web content and the corresponding authorized popup window source identifiers (step 750).

A determination is made as to whether a popup window is attempting to be displayed via the browser application (step 760). This determination may be made in a number of different ways. For example, criteria may be used for determine whether new pages are being spawned by the browser application that are not in the main content window. With Javascript, the execution of the "onload" command may be identified as generating a popup window. In more complex implementations, detailed analysis of the content of the spawned windows to the content of the main content window may be made, similar to the manner set forth in U.S. Pat. Publication No. 2004/0125149, which is hereby incorporated by reference. In a hardware implementation of the present invention, the mechanisms of the present invention analyze the data stream to identify when data is being retrieved from an unauthorized host address. The data that is retrieved from an unauthorized host address may then be blocked.

If a popup window is not attempting to be displayed, a determination is made as to whether a new request for web content is received (step 770). If so, the operation returns to step 720. If not, a determination is made as to whether a termination condition has occurred (step 775). A termination condition may be, for example, closing of the browser application, turning off of the client device, or the like. If a termination condition has occurred, the operation terminates. If a termination has not occurred, the operation waits for a popup to attempt to be displayed or a new request for web content to be received (step 780) and returns to step 760.

If a popup window is attempting to be displayed via the browser application (step 760), a determination is made as to whether the popup window passes the popup blocker filter criteria set by the user of the client device (step 790). That is, the user of the client device may have established a black list of websites, a white list of websites and/or keywords of permissible popup windows, or the like. This determination makes sure that the popup window first passes the user's requirements for a popup window to be displayed before determining if the popup window passes the currently displayed website owner/developer's requirements for the popup window. Of course, this determination may be made after making sure that the popup window passes the website owner/developer's requirements or at substantially the same time as this latter determination. Any ordering of these determinations may be used without departing from the spirit and scope of the present invention.

If the popup window passes the user's requirements in step 790, the source of the popup window is identified (step 800). That is, the browser attempts to retrieve the popup window data from a particular source by using a host name that resolves to a specific source address which can be used to thereby identify the particular source of the popup window. The source of the popup window is then compared against the list of authorized popup window source identifiers associated with the currently displayed web content (step 810). A determination is made as to whether the source of the popup window is present in the list of authorized popup window source identifiers (step 820). This may be done, for example, using a simple text string comparison, for example.

If the source of the popup window is present in the list of authorized popup window source identifiers, then the popup window is permitted to be presented via the browser application (step 830). Otherwise, if the source of the popup window is not present in the list of authorized popup window source identifiers, or if the popup window does not pass the user's requirements for display of the popup window, then the popup window's presentation via the browser application is blocked (step 840). The operation then returns to step 760.

Thus, the present invention provides a mechanism for allowing authorized popup windows on a website while blocking non-authorized popup windows on a website. With the present invention, filtering or blocking of popup windows is keyed to the identifiers of authorized sources of popups provided by the website owner/developer. Such filtering or blocking may be used alone or in combination with other types of popup blocking such that individual determinations as to whether a popup window should be allowed to be presented may be made with each attempt to load a popup window in a browser application.

While the above embodiments of the present invention have been described in the context of websites and web browser applications, it should be appreciated that the present invention is not limited to use with the Internet or with web browsers. To the contrary, the present invention may be used with any network and application used to access content on the network in which supplemental content is automatically loaded by the application with or without a user action.

In addition, while the above embodiments are described with rendering of popup windows in a visual or graphical display in mind, the present invention is not limited to such. Rather, any format of popup content may be filtered and/or blocked using the mechanisms of the present invention. For example, audio, tactile or visual popup content may be filtered and/or blocked by the mechanisms of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example; radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for presenting popup window content, comprising:
    receiving requested website content from a source of the requested website content;
    receiving, from the source of the requested website content, one or more identifiers of authorized sources of popup window content, wherein the one or more identifiers are associated with the requested website content;
    outputting the requested website content via an output device coupled to the data processing system; and
    blocking output of popup window content of popup windows whose source does not match an authorized source of popup window content in the one or more identifiers of authorized sources of popup window content, while the requested website content is being output by the output device coupled to the data processing system.

2. The method of claim 1, further comprising:
    generating a filter list based on the one or more identifiers of authorized sources of popup window content, wherein blocking output of popup window content includes comparing a source of popup window content to the filter list and blocking output of the popup window content if a matching entry in the filter list is not identified by the comparison.

3. The method of claim 2, further comprising:
    detecting a transition from the requested website content to other requested website content in a browser of the data processing system; and
    clearing the filter list in response to detecting the transition.

4. The method of claim 2, wherein the filter list is associated with the requested website content, and wherein a plurality of filter lists are stored for use in determining whether to block popup windows, and wherein the method further includes identifying a filter list corresponding to current website content being output by the output device.

5. The method of claim 1, wherein the one or more identifiers of authorized sources of popup window content are provided in code of the requested website content.

6. The method of claim 1, wherein the one or more identifiers of authorized sources of popup window content are provided as part of a meta tag in code of the requested website content.

7. The method of claim 6, wherein outputting the requested website content via an output device coupled to the data processing system includes:
    parsing the code of the requested website content to render the code via a browser application on the data processing system;
    identifying, while parsing the code of the requested website content, the meta tag in the code of the requested website content corresponding to the one or more identifiers of authorized sources of popup window content; and
    generating a filter list based on the identified meta tag in the code of the requested website content.

8. The method of claim 1, wherein the method is implemented by one of a plugin module to a browser application, an application running on the data processing system, or an applet loaded by a browser application.

9. The method of claim 1, wherein the method is hard coded in a hardware device associated with the data processing system.

10. The method of claim 9, wherein the hardware device is part of one of a proxy server or a firewall device.

11. A computer program product comprising a physical computer readable medium having a computer readable program stored thereon, wherein the computer readable program, when executed on a computing device, causes the computing device to:
    receive requested website content from a source of the requested website content;
    receive, from the source of the requested website content, one or more identifiers of authorized sources of popup window content, wherein the one or more identifiers are associated with the requested website content;
    output the requested website content via an output device coupled to the data processing system; and
    block output of popup window content of popup windows whose source does not match an authorized source of popup window content in the one or more identifiers of authorized sources of popup window content, while the requested website content is being output by the output device coupled to the data processing system.

12. The computer program product of claim 11, wherein the computer readable program further causes the computing device to generate a filter list based on the one or more identifiers of authorized sources of popup window content, and wherein the computer readable program causes the computing device to block output of popup window content by comparing a source of popup window content to the filter list and blocking output of the popup window content if a matching entry in the filter list is not identified by the comparison.

13. The computer program product of claim 12, wherein the computer readable program further causes the computing device to:
    detect a transition from the requested website content to other requested website content in a browser of the data processing system; and
    clear the filter list in response to detecting the transition.

14. The computer program product of claim 12, wherein the filter list is associated with the requested website content, and wherein a plurality of filter lists are stored for use in determining whether to block popup windows, and wherein the computer readable program further causes the computing device to identify a filter list corresponding to current website content being output by the output device.

15. The computer program product of claim 11, wherein the one or more identifiers of authorized sources of popup window content are provided in code of the requested website content.

16. The computer program product of claim 11, wherein the one or more identifiers of authorized sources of popup window content are provided as part of a meta tag in code of the requested website content.

17. The computer program product of claim 16, wherein the computer readable program causes the computing device to output the requested website content via an output device coupled to the data processing system by:
- parse the code of the requested website content to render the code via a browser application on the data processing system;
- identify, while parsing the code of the requested website content, the meta tag in the code of the requested website content corresponding to the one or more identifiers of authorized sources of popup window content; and
- generate a filter list based on the identified meta tag in the code of the requested website content.

18. The computer program product of claim 11, wherein the computer program product is executed as one of a plugin module to a browser application, an application running on the computing device, or an applet loaded by a browser application.

19. The computer program product of claim 11, wherein the computer program product is hard coded in a hardware device associated with the data processing system.

20. A system for presenting popup window content, comprising:
- a processor;
- a network interface coupled to the processor; and
- an output device coupled to the processor, wherein the processor:
- receives. via the network interface, requested website content and one or more identifiers of authorized sources of popup window content from a source of the requested website content, wherein the one or more identifiers are associated with the requested website content,
- outputs the requested website content via the output device, and
- blocks output of popup window content of popup windows whose source does not match an authorized source of popup window content in the one or more identifiers of authorized sources of popup window content, while the requested website content is being output by the output device.

* * * * *